United States Patent [19]

Eckel

[11] 4,256,435
[45] Mar. 17, 1981

[54] MOUNTING SUPPORT BLOCKS FOR PIVOTAL ROTOR OF WIND TURBINE

[76] Inventor: Oliver C. Eckel, 147 Hickory Rd., Weston, Mass. 02193

[21] Appl. No.: 930,207

[22] Filed: Aug. 2, 1978

[51] Int. Cl.³ .............................................. F03D 7/02
[52] U.S. Cl. .................................. 415/2 R; 416/207; 416/214 R
[58] Field of Search .............. 416/207, 208, 214, 248; 415/129, 2 A

[56] References Cited

U.S. PATENT DOCUMENTS

| | | | |
|---|---|---|---|
| 2,573,875 | 11/1951 | Riddiford | 416/207 |
| 3,161,239 | 12/1964 | Andersen | 416/214 |
| 3,231,022 | 1/1966 | Schroeter et al. | 416/207 |
| 3,357,496 | 12/1967 | Petersen | 416/207 |
| 3,545,884 | 12/1970 | Schroeter | 416/207 |
| 3,561,883 | 2/1971 | Berry | 416/207 |
| 3,594,099 | 7/1971 | Herbert | 416/207 |
| 3,984,194 | 10/1976 | Fermer et al. | 416/207 |
| 4,021,135 | 5/1977 | Pedersen et al. | 415/2 A |
| 4,075,500 | 2/1978 | Oman et al. | 416/2 A |

FOREIGN PATENT DOCUMENTS

| | | | |
|---|---|---|---|
| 515388 | 8/1955 | Canada | 416/207 |
| 703458 | 2/1954 | United Kingdom | 416/208 |

*Primary Examiner*—Everette A. Powell, Jr.
*Assistant Examiner*—A. N. Trausch, III
*Attorney, Agent, or Firm*—Schiller & Pandiscio

[57] ABSTRACT

A new and improved type of rotor blade assembly is disclosed for use in a power-generating, wind-driven turbine. The present invention comprises a plurality of support blocks each mounting a rotor blade and captivated between two rings so as to form a cylindrical rotor array with radially-extending blades.

The present invention offers the dual advantages of reduced fabrication costs and increased ease of manufacture.

13 Claims, 5 Drawing Figures

MOUNTING SUPPORT BLOCKS FOR PIVOTAL ROTOR OF WIND TURBINE

BACKGROUND OF THE INVENTION

1. Field of the Invention

This invention relates to the harnessing of wind power in general and more particularly to a novel type of rotor apparatus for converting kinetic wind energy to mechanical or electrical energy.

2. Description of the Prior Art

Windmills have been known and used for centuries as power generators and have typically been used to pump water, generate electricity and grind grains. Much attention has recently been devoted to improving the efficiency of and lowering the cost of windmill structures in an effort to better harness the plentiful supply of pollution-free power that wind offers. An alternative to a windmill is a wind turbine. The latter offers the advantage of greater efficiency. My German Patent Specification No. P2629923, published Jan. 27, 1977, discloses a wind turbine designed to provide relatively high efficiency with relatively low manufacturing costs.

One of the major components of a wind turbine of the type shown in my German Patent Specification No. P2629923 is the rotor assembly, generally comprised of a cylindrical base mounting blades in an outward radial array. Due to its application in the wind turbine, the cylinder must be relatively lightweight and be sufficiently round to avoid rotor imbalance. My prior designs to achieve these characteristics necessitates spending significant amounts of skilled-worker time fabricating the cylinder and considerably complicates the handling of the part during construction, thereby increasing costs.

As a result, one of the objects of the present invention is to produce a rotor assembly which is light in weight and near-perfect in roundness.

Another object of the invention is to produce a rotor assembly which is simple to produce and easy to handle during fabrication of the turbine.

Yet another object is to produce a rotor assembly which can be assembled and installed by relatively unskilled workmen.

Another object of this invention is to produce a rotor assembly which can easily be serviced for replacement of parts.

SUMMARY OF THE INVENTION

These and other objects of the present invention which are hereinafter described or rendered obvious are achieved by providing a novel rotor assembly which comprises a plurality of support blocks captivated between two rings so as to form a cylindrical array, upon which are mounted a series of radially-extending rotor blades.

BRIEF DESCRIPTION OF THE DRAWINGS

Other features and many of the attendant advantages of this invention will be disclosed or rendered obvious in the following detailed description of the invention, which is to be considered together with the accompanying drawings wherein.

DESCRIPTION OF THE PREFERRED EMBODIMENT

Figure 1:
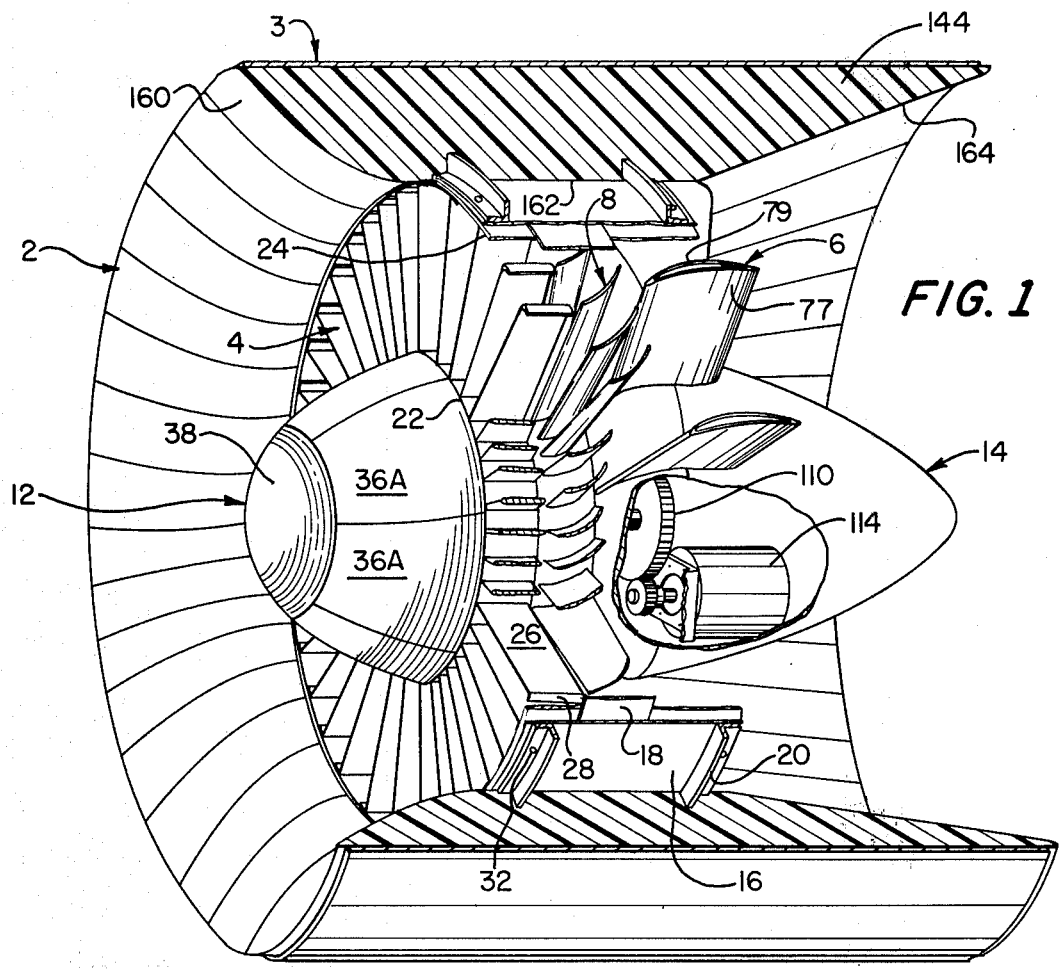
FIG. 1 is a perspective view of a wind turbine employing a preferred form of the invention, with certain portions shown in section.
Figure 2:
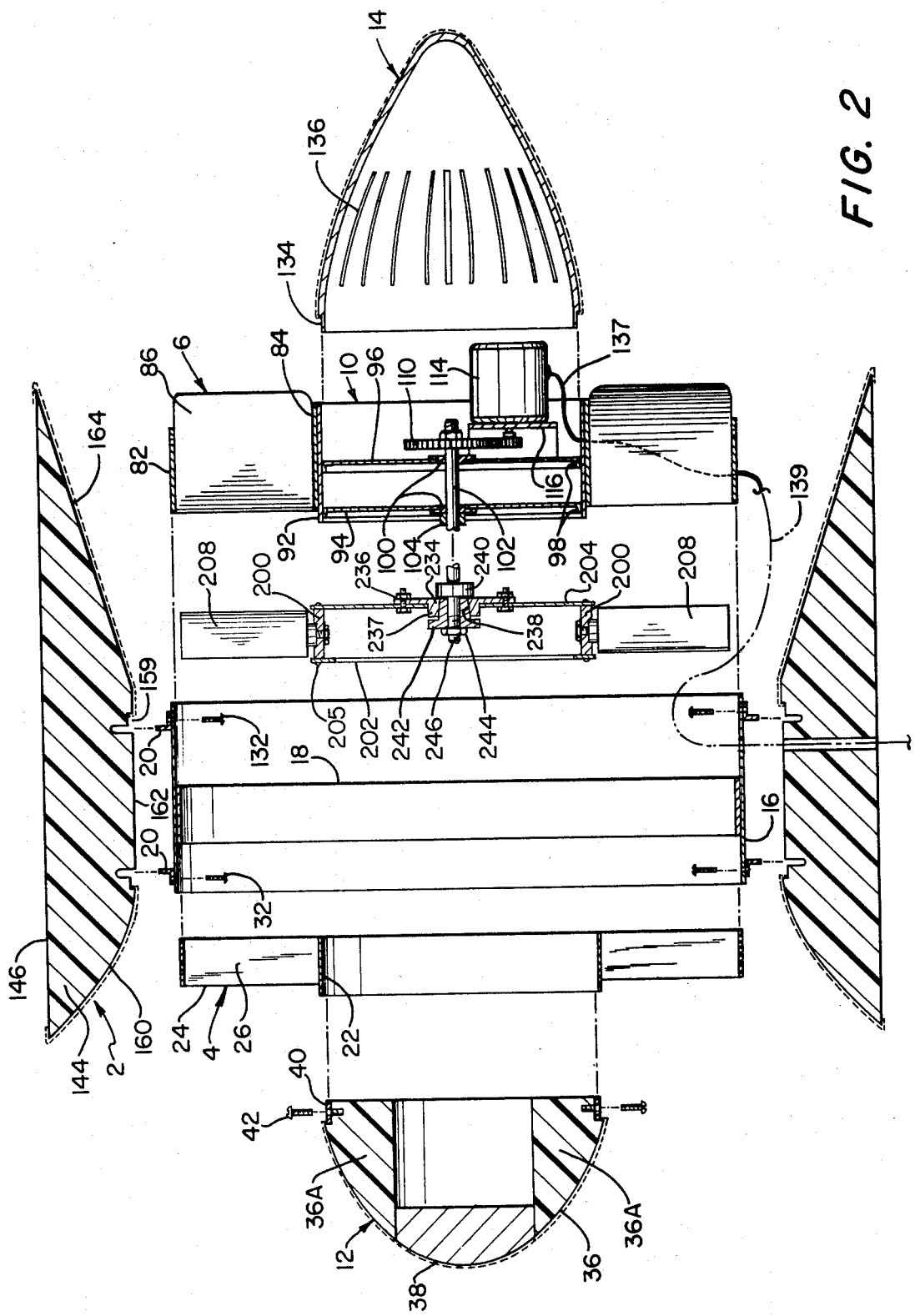
FIG. 2 is an exploded longitudinal sectional view of the same turbine.

Turning first to FIGS. 1 and 2, we see a modified wind turbine, essentially the same as the one described in my published German Patent Specification No. P2629923 but employing the improved rotor assembly which embodies the present invention. It comprises a shroud 2 which forms a wind-gathering venturi, a jacket 3 for encasing the shroud, an inlet stator assembly 4, an outlet stator assembly 6, the improved rotor assembly 8 located between the inlet and outlet stator assemblies, a rotor transmission housing 10, a nose cone 12 and a tail cone 14. The shroud surrounds the stator and rotor assemblies.

As may be seen, the stator and rotor assemblies and the rotor transmission housing are all attached to a main casing ring assembly comprising a cylindrical main casing ring 16 and a cylindrical stator casing ring 18. Member 18 is attached to the inner surface of member 16 and functions as a shroud for the rotor assembly and also as locating stops for the inlet and outlet stator assemblies. One or more angle iron stiffening rings 20 may be used to reinforce the outer surface of main casing 16.

Inlet stator assembly 4 comprises a pair of cylindrical and concentric inner and outer stator blade support rings 22 and 24 and a plurality of equally spaced stator blades 26. Stator blades 26 extend radially between members 22 and 24 and are mounted so that their leading and trailing edges are aligned with the center axis of the support rings. The front stator unit is attached to main casing ring 16 via flanges 28 and screws 32 and engages with stator spacing ring 18.

The inlet stator assembly supports a nose cone 12, which is preferably of sectional construction comprising a unit 36 made of two or more sections 36A, a nose plug 38 and a retaining ring 40 (FIG. 2). Ring 40 is used to assist binding members 36 together and is held in place via screws 42 or other suitable means. Nose cone 12 is sized so that it can slip within the inner stator support ring 22 and form a firm fit with the interior surface of said ring, being secured in this position by means of screw fasteners or other suitable means.

The outlet stator assembly 6 comprises inner and outer ring supports 82 and 84 and a plurality of stator support blades 86 which are attached to and extend from members 82 and 84. The outlet stator blades are not flat but instead have the configuration of an airfoil with concave sides 77 and convex sides 79. The pitch of the stator blades is generally oriented opposite to the pitch of the rotor blades, which will be described later.

Attached to the outlet stator assembly 6 is the rotor transmission housing 10, which itself comprises a cylindrical shroud 92 and a pair of flat discs 94 and 96 which may be welded to the outer shroud or have peripheral flanges 98 which are welded to the shroud or are otherwise attached to it. Discs 94 and 96 each have a center opening and secured in each center opening is a conventional roller bearing assembly 100, which surrounds and supports a transmission drive shaft 102. Drive shaft 102 is coupled on one end to the rotor assembly 8 by means described below and stabilized in position by its association with a spacer 104 against the roller bearing assembly 100 in disk 94. Shaft 102 is coupled on its opposite end to a large gear 110 which forms part of a transmission for driving one or more electrical generator units 114. For this purpose, mounting bracket 116 is provided to support the generator unit(s).

The rotor transmission and housing are constructed first as a discrete sub-assembly, and then the rotor assembly is slipped onto and secured to shaft 102. Then the resulting assembly is slipped into the main casing ring 16 so that outer support ring 82 of the outlet stator assembly engages the rear edge of the stator spacing ring 18 and is secured to the main casing ring by suitable fasteners as shown at 132.

Tail cone 14 is a hollow structure having the shape of a regular cone and is formed with a peripheral groove 134 so as to fit within the rotor transmission housing shroud 92. Screws or other suitable fasteners may be used to fix the cone in place. The cone serves as protective cover for generator(s) 114 and associated transmission apparatus, as well as a negative venturi to vent the cycled air from the turbine. Slits 136 may be provided in cone 14 to dissipate any heat generated by the transmission assembly or generators. The cone may be penetrated by a flexible power cable 137 to draw off electricity as shown, though it is preferred to pass the cable along the route denoted by the broken line 139.

The outer shroud 2 consists of at least two, and preferably more than two, complementary sections 144 formed of lightweight material such as polyurethane foam. This may be seen in FIG. 3. When the sections are assembled side by side and prevented from separating by some suitably circumferentially extending means such as jacket 3, the complementary sections support one another and form a circular array with their outer surfaces 146 combining into a cylindrical outer configuration.

Jacket 3 is similarly constructed in the preferred embodiment of more than one member 150. The members 150 are circularly curved in cross-section but are straight in a longitudinal sense, and their edges are bent to form offset lips 152 which extend into slots 154 of selected shroud sections 144. Slip lock cleats in the form of channel members 156 hold members 150 in assembled relation, with side edges 158 interlocking with jacket members.

Shroud 2 is assembled around the main casing ring, with stiffening rings 20 extending into recesses 159 formed in center portions 162 of the inner surfaces of the shroud sections. The inner surfaces of each shroud section 144 comprises a forward mouth-defining section 160, a center portion 162 and a rear portion 164, with the inner surfaces of all three portions being circularly curved in cross-section but differing in shape in a longitudinal sense.

Figure 3:
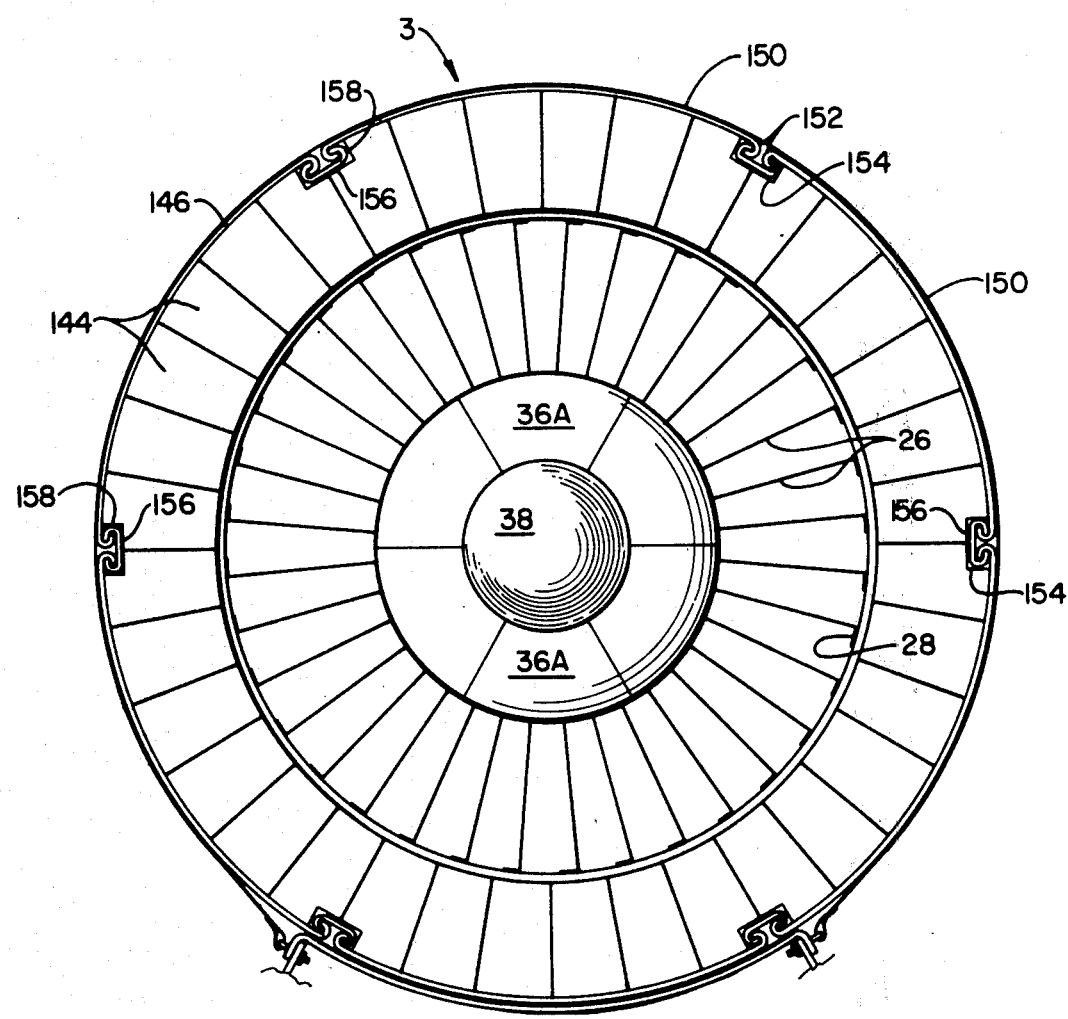
FIG. 3 is a front elevation of the same turbine.

The turbine may be mounted to a support platform as shown in FIG. 3. Preferably, though not necessarily, this support platform is pivoting so as to allow the turbine to be continually faced into the wind.

Mounted between the inlet stator assembly 4 and the outlet stator assembly 6 is the new rotor assembly 8, which comprises the present improvement over the prior art. The location of the rotor assembly relative to the other parts of the wind turbine may be seen in FIGS. 1 and 2, and specific details of the rotor assembly may be seen in FIGS. 4 and 5.

Figure 4:
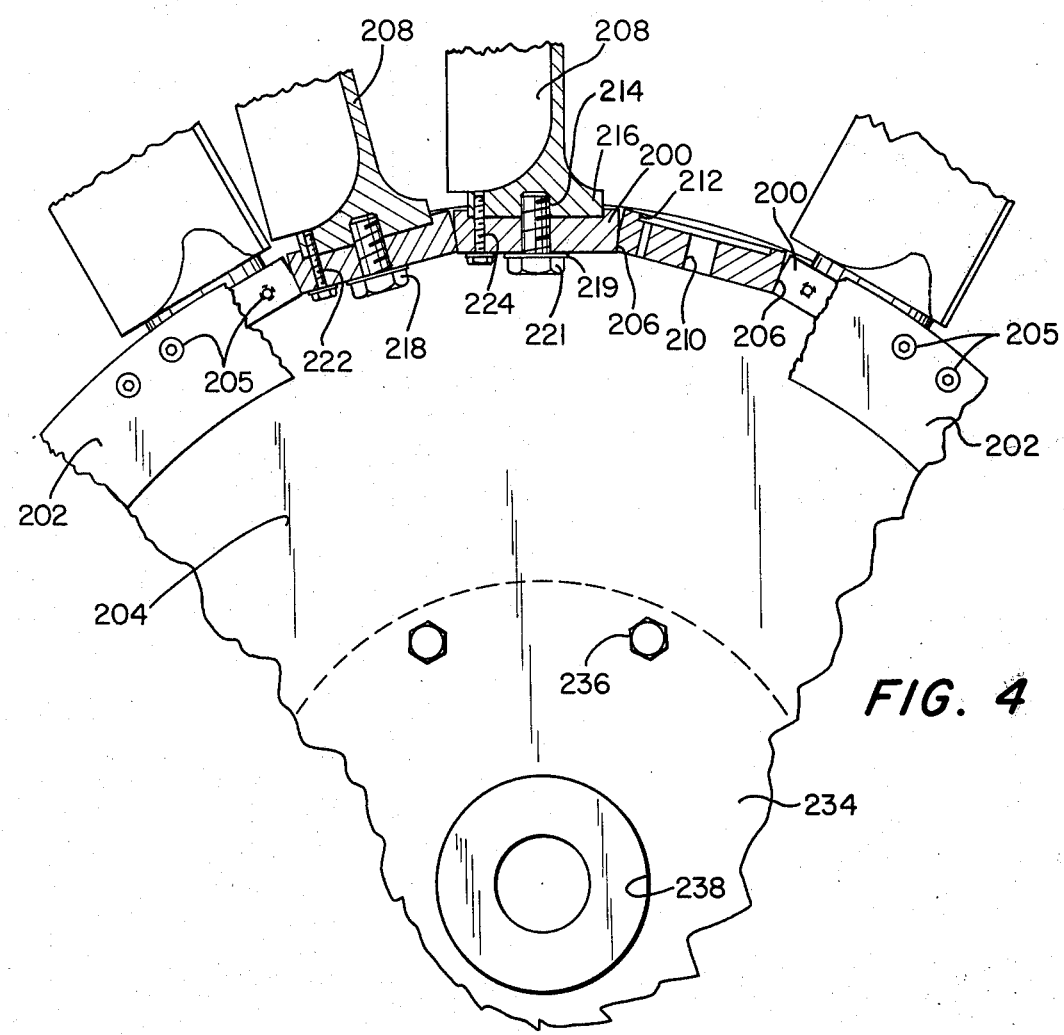
FIG. 4 is a fragmentary front view of the preferred embodiment of the present invention.

The new rotor assembly 8 is comprised of a plurality of mounting blocks 200 securely encased between a forward support ring 202 and a rear support ring 204 so as to form a cylindrical array. Mounting blocks are preferably, though not necessarily, formed of extruded aluminum. Screws 205 are used in the preferred embodiment to secure the ends of the mounting blocks to the support rings, though other suitable means may be substituted. The opposite sides 206 of the mounting blocks 200 are preferably bevelled as shown in FIG. 4 so as to allow adjacent blocks to engage and support one another in a circumferential direction so as to form a more stable cylindrical array.

Attached to each mounting block 200 is a rotor blade 208, extending radially outward from the cyclindrical array of blocks. For this purpose each block 200 is provided with a bore 210 and a counterbore 212, and each blade 208 has a blind hole 214 and a mounting shoulder 216 which has a cylindrical peripheral surface 217. Shoulder 216 is sized so as to form a tight sliding fit within counterbore 212, and bore 210 and hole 214 are sized and aligned so as to receive a cap screw 218 and a lock washer 219 so as to pivotally attach the rotor blade 208 to support block 200.

A plurality of threaded bores 220 are formed in each blade shoulder 216 near its perimeter, at intervals which may or may not be equally spaced, and a plurality of smooth bores 222 are formed in block 200 and are adapted to receive screws 224. Bores 222 may or may not be equally spaced and are positioned so that when rotor blade 208 is rotated within counterbore 212 each bore 220 can be alternately aligned with each bore 222. A screw 224 may be inserted into one of the bores 222 so as to be screwed into one of the bores 220 and thereby fix rotor blade 208 against rotation on cap screw 218. The attack angle of blade 208 may be quickly adjusted to take advantage of changing wind conditions simply by removing screw 224 and rotating the rotor blade to the desired position, and then reinserting and tightening the screw.

Figure 5:
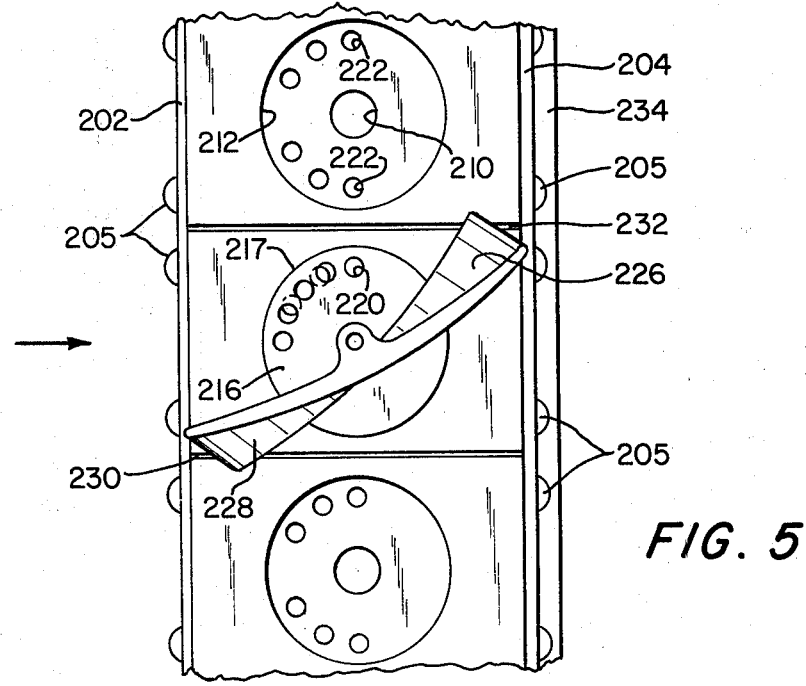
FIG. 5 is a fragmentary plan view illustrating the shape of one of the rotor blades.

In direct contrast to the radial fins of the inlet stator, each of the blades 208 is formed with a helical curvature along its length. While the rotor blades may be formed so that their opposite sides are flat in cross-section, it is preferable that the blades have a cross-section generally similar to an airfoil. Specifically, one side 226 of the rotor blade is formed with a concave curvature and the other side 228 is formed with a convex curvature. Additionally, the rotor blade is curved helically about the pivot axis of shoulder 216 and the inner end of the blade has a smaller dimension edge-to-edge then the outer end. The air displacement of the rotor blade increases with increasing distance from shoulder 216. The pitch of the rotor blade also varies with increasing distance from shoulder 216, with the absolute value of the pitch being set by the angular position of the shoulder 216 on its pivot axis. Preferably the blade is curved helically through an angle of about 15°–20° and the blade is set by rotation of shoulder 216 so that the angle of attack of the leading edge 230 is optimum for the prevailing wind velocity. With reference to FIG. 5, the angle of attack is defined as the angle between one line running from leading edge 230 to the pivot axis of the blade and a second line running from the pivot axis at a right angle to the support ring 202. The length of the rotor blades is such that the outer ends of the rotor blades lie close enough to the stator casing ring 18 so that substantially all of the air which passes between the inlet stator blades must pass between the rotor blades, but far enough from the stator casing ring that the rotor blades may be removed from the rotor assembly while the assembly is mounted in the turbine.

Flange 234 is attached to support ring 204, preferably via bolts 236, and is provided with a hub 237 surrounding a tapered center bore 238. Flange 234 is sized so that its center bore is somewhat larger than the diameter of shaft 102 and the outer diameter of its bore shoulders form a tight fit with the inner wall of support ring 204. The rotor assembly is normally preassembled as a unit and then mounted in the turbine. The rotor assembly is mounted to shaft 102 by means of a wedge-type bushing arrangement. First shaft 102 is placed through bore 238 until a shoulder or stop disc 240 on the shaft is engaged. Then a bushing 242 is fit over the free end of shaft 102 and held tightly in place, preferably by means of a nut 244 mounted on threads 246 formed on the front end of shaft 102, engaging the tapered wall of bore 238 so as to fix the rotor assembly firmly to the shaft. In this manner rotational movement of the rotor assembly will be transferred to shaft 102 and hence to the power conversion units linked thereto.

Described briefly, the turbine employing the present invention functions as follows: air entering the Venturi mouth of the turbine is concentrated and undergoes an increase in velocity as it passes through the mouth into the inlet stator stage. The air is made laminar or at least substantially less turbulent as it passes between the vanes of the inlet stator into the rotor stage. The high speed air causes the rotor to rotate at a speed proportional to the velocity of the air at the leading edge of the Venturi mouth. As the rotor is driven, output shaft 102 acts through the associated gear system to drive the associated generators 114, thereby producing power for direct use or storage.

There are numerous advantages to using this new rotor assembly. First, the present invention is highly modular in construction, thereby allowing easy replacement of damaged or worn-out parts. Second, few of the parts require special care or skills during their fabrication. Third, the rotor assembly is comprised of low-cost components commercially available. Fourth, since the rotor is intended to be preassembled as a unit before mounting in the turbine, various structural and balancing tests may be conducted on the rotor unit and any necessary adjustments made before it is installed in the turbine.

Many modifications of the preferred embodiment are also envisioned. Thus, a square or rectangular or otherwise polygonally-shaped shoulder may be substituted on the rotor blade for the round shoulder shown, provided that corresponding modifications are made to counterbore 212. Alternatively, the counterbore may be omitted entirely with the blade shoulder simply being attached to and resting upon the top surface of the support block 200. And it is envisioned that support rings 202 and 204 may be formed with a plurality of holes to reduce weight.

Additionally, the support blocks may be formed with a cross-sectional shape similar to the cross-section of members 144, so as to further increase the structural stability of the rotor. This would be a simple matter using extruded aluminum. Indeed, the support blocks may even be formed large enough to accommodate more than one blade each.

Obviously also the rotor assembly of this invention may be used in air turbines constructed differently than the one herein described, as, for example, in a turbine that lacks front and/or rear stator assemblies.

These and other changes of their type are foreseen as readily obvious to one skilled in the art.

What is claimed is:

1. A rotor blade assembly comprising:
   (1) a plurality of support blocks each extending between and terminating adjacent to two rings, and means for releasably securing each of said support blocks individually to said rings so that said support blocks are captivated between said rings and form a cylindrical array, each support block having a recess;
   (2) a plurality of rotor blades each attached to and extending radially outward from one of said support blocks, each of said blades comprising a fin and a mounting shoulder at the bottom of each fin, each of said mounting shoulders being disposed in one of said recesses; and
   (3) means for securely attaching said array of support blocks to a shaft that is coaxial with said array so that wind striking said rotor blades will cause said blades and said array of support blocks to rotate and impart rotation to said shaft.

2. A rotor blade assembly according to claim 1 wherein each of said rotor blades is pivotally mounted to one of said support blocks by means of a first threaded stud or cap screw, and is locked in place by means of a second threaded stud or cap screw, and further wherein each support block has a plurality of holes for accommodating said second stud or cap screw, whereby to permit each of said rotor blades to be rotated to vary its pitch.

3. A rotor blade assembly according to claim 1 wherein each mounting shoulder has a circular cross-section.

4. A rotor blade assembly according to claim 1 wherein adjacent sides of said support blocks are provided with bevelled surfaces which engage one another so as to provide structural stability for said array.

5. A rotor blade assembly according to claim 1 further including means connecting said shoulders with said support blocks for preventing rotation of said rotor blades relative to said support blocks.

6. A rotor blade assembly according to claim 1 further including a plurality of fasteners each disposed so as to lock one of said blades to one of said support blocks.

7. A rotor blade assembly comprising:
   (1) two parallel and coaxial mutually spaced rings;
   (2) a plurality of support blocks each extending between and terminating adjacent to said two rings, and means for releasably securing each of said support blocks individually to said rings so that said support blocks are captivated between said rings and form a cylindrical array;
   (3) each support block having bevelled surfaces at opposite edges thereof and a recess between said opposite edges, said each bevelled surface of said block being in engagment with the bevelled surface of each adjacent block, so as to support one another and provide stability to said array;
   (4) a plurality of rotor blades each mounted to and extending radially outward from one of said support blocks, each of said rotor blades comprising a bottom mounting shoulder disposed in one of said recesses and an upper fin for deflecting air, said fin being formed integrally with said shoulder; and (5) means for securely attaching the foregoing structure to a shaft so that said array of mounting blocks is coaxial with said shaft, whereby wind striking the fins of said rotor blades will cause said blades and array of support blocks to rotate and case a rotational force to be transmitted to said shaft.

8. A rotor blade assembly according to claim 7 wherein each shoulder is pivotally mounted in one of said recesses, and further including releasable means for locking each shoulder against pivoting movement relative to the support block with which it is engaged.

9. A rotor blade assembly according to claim 8 wherein each support block and each mounting shoulder is provided with a plurality of holes disposed so that each of the holes in each shoulder may be alternatively aligned with each hole in the mounting block, and said locking means comprises a stud or screw extending through an aligned pair of holes in said mounting shoulder and said support block.

10. A rotor blade assembly according to claim 9 wherein each of said blades is pivotally mounted and locked to a support block by two fasteners, one of which is disposed substantially along the axis of the blade and the other of which is eccentric to said axis.

11. A rotor blade assembly according to claim 7 wherein said upper fin is formed with a helical curvature.

12. A wind turbine comprising:
   at least one stator assembly; a rotor assembly, said at least one stator assembly and said rotor assembly being axially aligned with one another; a shroud surrounding said at least one stator assembly and said rotor assembly, said shroud having an inwardly-tapered mouth at one end forward of said stator assembly for funneling air into said stator assembly, and a throat section for confining air passing through said stator assembly so that substantially all of said air travels through said rotor assembly and thereby causes rotation of said rotor assembly; and transmission means connected to said rotor assembly for transmitting the energy of rotation of the rotor to a power device;
   the improvement wherein the rotor blade assembly is characterized by a structure which essentially comprises:
   (1) two parallel and coaxial mutually spaced rings;
   (2) a plurality of support blocks each extending between and terminating adjacent to said two rings, and means for releasably securing each of said support blocks individually to said rings so that said support blocks are captivated between said rings and form a cylindrical array;
   (3) each support block having bevelled surfaces at opposite edges thereof and a recess between said opposite edges, with each bevelled surface of each block being in engagement with the bevelled surface of the adjacent block so as to mutually support one another and provide stability to said array;
   (4) a plurality of rotor blades each mounted to and extending radially outward from one of said support blocks, each of said rotor blades comprising a bottom mounting shoulder disposed in one of said recesses and an upper fin for deflecting air, said fin being formed integrally with said shoulder; and
   (5) means for securing the foregoing structure to a shaft so that said array of mounting blocks is coaxial with said shaft, whereby wind striking the fins of said rotor blades will cause said blades and array of support blocks to rotate and cause a rotational force to be transmitted to said shaft.

13. A wind turbine according to claim 12 wherein each shoulder is pivotally mounted in one of said recesses, and further including means for locking said rotor blades to said support blocks so that said shoulders cannot move in said recesses, said means for locking said rotor blades to said support blocks comprising fasteners extending radially through said support blocks into said rotor blade shoulders.

* * * * *

UNITED STATES PATENT AND TRADEMARK OFFICE
CERTIFICATE OF CORRECTION

PATENT NO. : 4,256,435
DATED : March 17, 1981
INVENTOR(S) : Oliver C. Eckel

It is certified that error appears in the above-identified patent and that said Letters Patent are hereby corrected as shown below:

Claim 7, column 7, line 5, the word "case" should be -- cause --.

Signed and Sealed this

Sixteenth Day of June 1981

[SEAL]

Attest:

RENE D. TEGTMEYER

Attesting Officer     Acting Commissioner of Patents and Trademarks